Feb. 16, 1926.

J. C. PAPADOPOULOS

TELEGRAPHONE

Filed July 10, 1923

INVENTOR
John C. Papadopoulos
BY
ATTORNEYS

Feb. 16, 1926.
J. C. PAPADOPOULOS
TELEGRAPHONE
Filed July 10, 1923
1,573,740
6 Sheets-Sheet 2

INVENTOR
John C. Papadopoulos
BY
ATTORNEYS.

Feb. 16, 1926.　　　　　　　　　　　　　　　　　　1,573,740
J. C. PAPADOPOULOS
TELEGRAPHONE
Filed July 10, 1923　　6 Sheets-Sheet 3

INVENTOR
John C. Papadopoulos
BY
ATTORNEYS

Feb. 16, 1926.
1,573,740

J. C. PAPADOPOULOS

TELEGRAPHONE

Filed July 10, 1923  6 Sheets-Sheet 4

INVENTOR
John C. Papadopoulos
BY
ATTORNEYS.

Feb. 16, 1926.

J. C. PAPADOPOULOS

TELEGRAPHONE

Filed July 10, 1923

INVENTOR
John C. Papadopoulos
BY
ATTORNEYS.

Feb. 16, 1926.         1,573,740
J. C. PAPADOPOULOS
TELEGRAPHONE
Filed July 10, 1923     6 Sheets-Sheet 6

INVENTOR
John C. Papadopoulos
BY
ATTORNEYS.

Patented Feb. 16, 1926.

1,573,740

UNITED STATES PATENT OFFICE.

JOHN C. PAPADOPOULOS, NOW BY JUDICIAL CHANGE OF NAME KNOWN AS JOHN PAULAS, OF NEW YORK, N. Y.

TELEGRAPHONE.

Application filed July 10, 1923. Serial No. 650,621.

*To all whom it may concern:*

Be it known that I, JOHN C. PAPADOPOULOS, a citizen of the United States of America, residing at 644 West 173rd Street, city, county, and State of New York, have invented certain new and useful Improvements in Telegraphones, of which the following is a specification.

This invention relates to that class of devices commonly known as telegraphones which are adapted to serve as an attachment to the ordinary subscriber's telephone set for the purpose of automatically transmitting and receiving messages by means of any of the well known types of talking machine records, during the absence of the party.

The principal object of this invention is to improve upon the construction of the device shown in my co-pending application for Letters Patent of the United States, Serial No. 641,926, filed May 28, 1923.

For the accomplishment of this and such further objects as will be apparent to those skilled in the art to which this invention appertains from a reading of the following disclosure and by reference to the accompanying drawings forming a part hereof, wherein is shown an embodiment of the invention, it will be understood that such changes, variations and modifications may be resorted to which fall within the scope of the claims hereunto appended.

Figure 17:
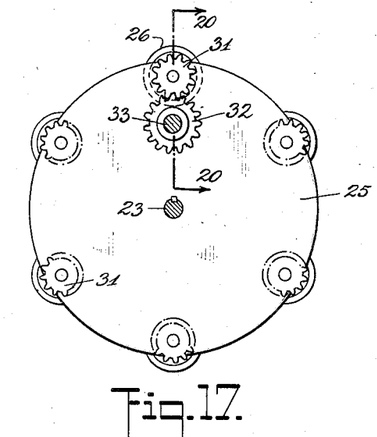
Fig. 17 is a section on the line 17—17 of Fig. 1.
Figure 20:
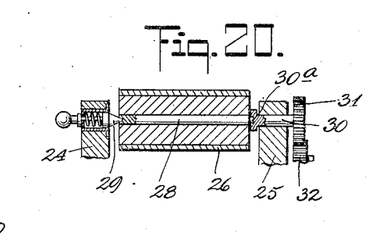
Fig. 20 is a section on the line 20—20 of Fig. 17.

As shown in the drawings a casing 20 has secured to the base thereof a pair of brackets 21, 22, in which is journalled a shaft 23 having fixed thereto a pair of record supporting disks 24, 25, between which the records 26 are detachably and rotatably mounted. Each record 26 which consists of the usual hollow wax cylinder is tapered interiorly and is mounted upon a tapered mandrel 27 (see Fig. 20) secured upon a shaft 28, one end of which is rotatably supported by a spring pressed center 29 mounted in disk 24 and the other end of shaft 28 is squared to fit within a squared socket 30ª in one end of a shaft 30 journalled in disk 25, the other end of shaft 30 having secured thereto a gear 31. The gear 31 for each mandrel is adapted, when brought to the top position shown in Fig. 17, to mesh with an intermediate gear 32 mounted upon a shaft 33, suitably journalled in the casing 20 and bracket 22 and which shaft and gear is driven from the spring motor 34 by means of the gearing 35, the spring motor being provided with the usual winding key 34ª. Upon the shaft 36 of the spring motor is secured a centrifugal governor 37 of any suitable type having a brake disk 38 secured thereto and with which disk the brake rod 39 is adapted to be engaged or disengaged by means to be hereinafter described.

Suspended in any suitable manner at the upper part of the casing are a pair of sound boxes 40 and 41 each provided with a suitable stylus or needle adapted to contact with its co-operating record. Sound box 41 is adapted to co-operate with the records 26 which are intended to record the incoming messages, while sound box 40 co-operates with a short record 42 preferably provided with a suitable sending message to inform the party calling that the telegraphone is attached and that a message will be recorded. Record or cylinder 42 is detachably mounted in a manner similar to the records 26 by means of a mandrel upon a shaft 43 located just above shaft 33 and journalled between the casing and bracket 22. A gear 44 fixed upon one end of shaft 43 meshes with the gearing 35 and an idler gear 45 mounted upon the other end of shaft 43 meshes with a gear 46 fixed upon shaft 33, and drives a gear 47 secured adjacent one end of a feed screw 48, which is rotatably supported in the casing 20 and a suitable bracket 49

Figure 1:
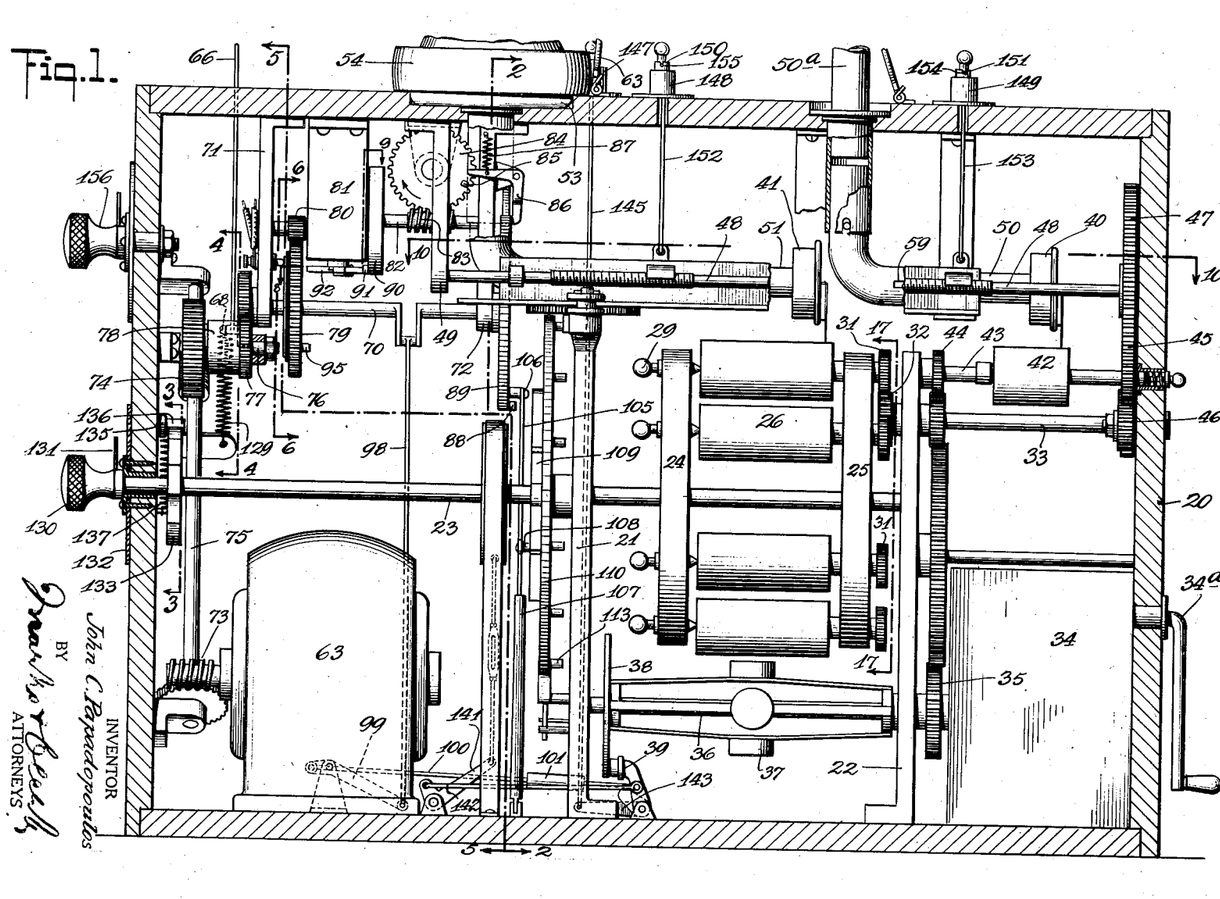
Fig. 1 is a central longitudinal vertical section through the device.
Figures 2, 3, 4:
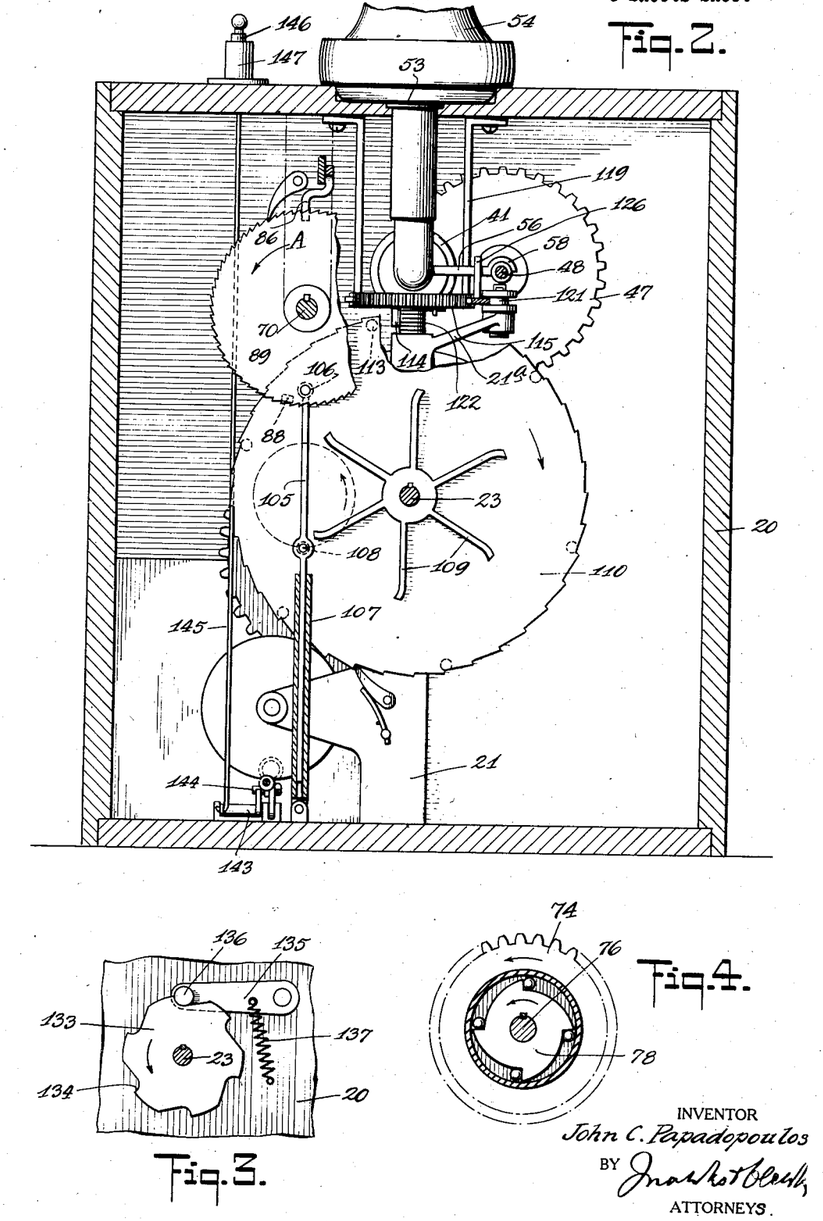
Figs. 2, 3, 4, 5 and 6 are sections on the lines 2—2, 3—3, 4—4, 5—5 and 6—6 respectively of Fig. 1.
Figure 18:
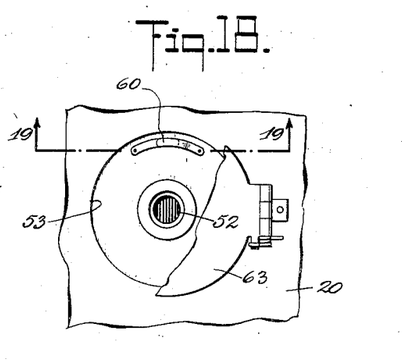
Fig. 18 is a plan view of a part of the top of the casing showing the construction of the telephone receiver recess with the switch therein.
Figure 19:
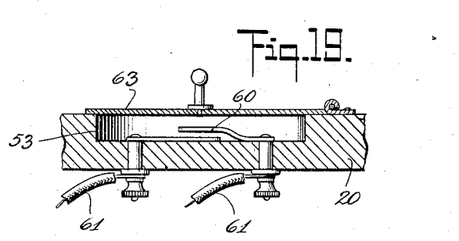
Fig. 19 is a section on the line 19—19 of Fig. 18.
Figure 22:
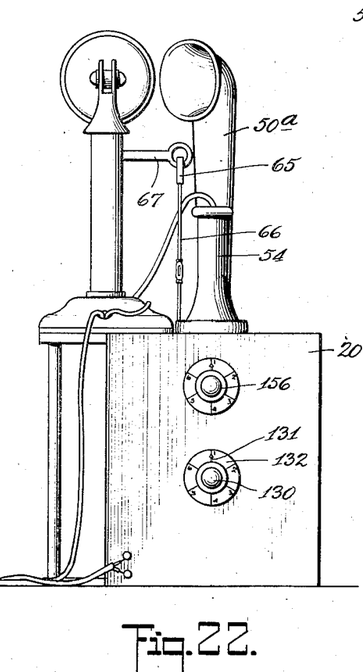
Fig. 22 is an end view of the device with the subscriber's set attached thereto and Fig. 23 is a diagrammatic showing of the controlling electric circuit.
Figure 23:
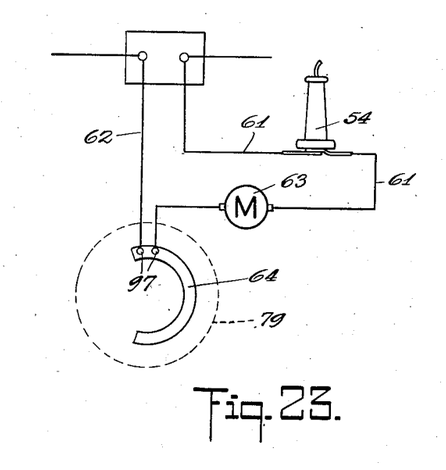

Sound box 40 is in communication by means of a sliding telescopic conduit 50 with a sounding horn 50ª adapted to be directed towards the transmitter of the telephone to transmit the message from the record 42, while sound box 41 is in communication through a similar conduit 51 with an orifice 52 centrally disposed in a recess 53 (see Fig. 18) in the top of the casing and in which recess the receiver 54 is adapted to be placed as clearly shown in Figs. 1, 2 and 22.

The conduits 50 and 51 have projecting from the inner cylindrical members thereof the arms 55 and 56, respectively (see Figs. 10 to 14, inclusive) the outer ends of which are formed into the half nuts 57 and 58 which are adapted to engage with the screw 48. A slot 59 is provided in the outer conduit members to provide clearance for each arm sufficient to permit the telescoping movement of the conduits and also to permit sufficient vertical movement of the arms to disengage the half nuts 57 and 58.

Secured within the recess 53 for the receiver is a switch 60 the poles of which are constructed of spring metal and are normally open but which are adapted to be closed by the weight of the receiver 54 when it is placed within recess 53, thereby closing the circuit through the lead wires 61. A pivoted cover 63 is preferably provided for recess 53. Lead wires 61 form one branch of a circuit which is connected across the telephone line and leads to a small alternating current motor 63. The other branch 62 of said circuit has a timing switch plate 64 interposed therein for a purpose which will be hereinafter set forth.

Figure 5:
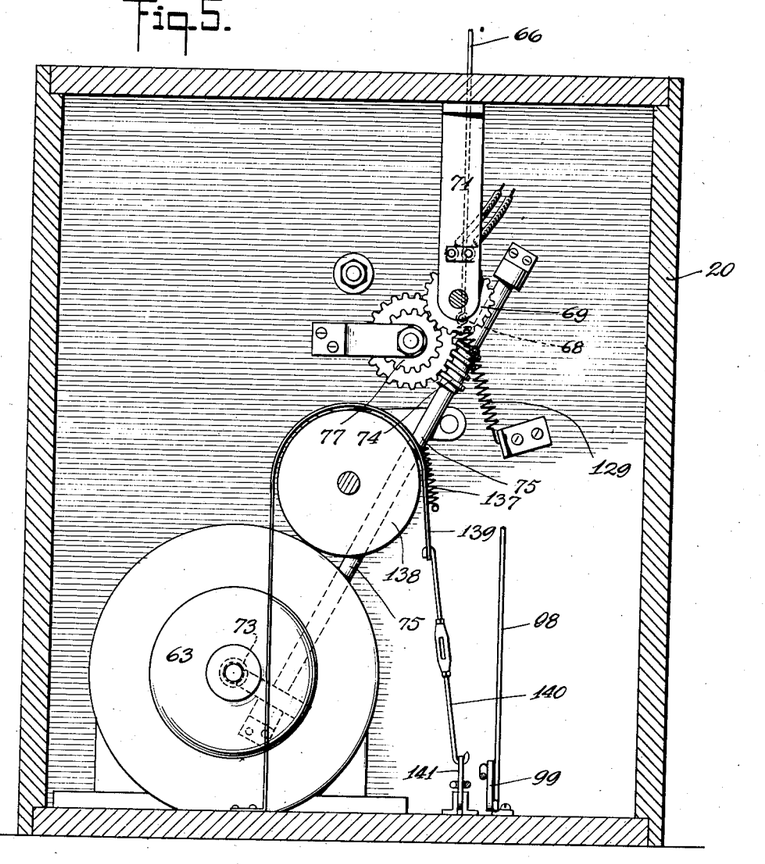
Figure 21:
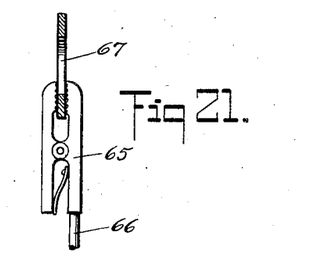
Fig. 21 is an enlarged detail of the clamp used to connect the device to the receiver hook of the telephone.

A spring actuated clamp 65 as shown in Fig. 21 is mounted upon the upper end of a connecting rod 66 for detachably securing said rod to the receiver hook 67 (see Fig. 22) while the lower end of said rod is pivotally secured to a crank pin 68 (see Figs. 1 and 5) projecting from a gear 69, a turnbuckle 66ª being provided on said rod 66 for adjusting the same. Gear 69 is secured upon one end of a crank shaft 70, suitably journalled in brackets 71, 72, depending from the top of the casing, and is driven from the motor 63 by worm gearings 73, 74, shafts 75, 76, and spur gear 77. A one way clutch 78 of the type shown in Fig. 4 is interposed upon shaft 76 between the worm gearing 74 and spur gear 77.

A spur gear 79 is fixed to crank shaft 70 and meshes with a pinion 80 mounted upon the shaft of a small spring motor 81. A suitable governor (not shown) is provided within the casing of spring motor 81 and the main shaft 82 of said motor has secured thereto a worm 83 which is in mesh with a worm gear 84. A small pin or lug 85 projects laterally from the face of the worm gear and is adapted to engage a pivoted stop lever 86 upon each revolution of the worm gear 84. Stop lever 86 is normally held by spring 87 in the path of a pin 88 projecting from the face of a ratchet wheel 89. Ratchet wheel 89 is secured to the end of crank shaft 70 and the pin 88 is so located that it will contact with stop lever 86 when the throw of crank shaft 70 reaches the upper limit of its travel.

Figures 10, 11, 15, 16:
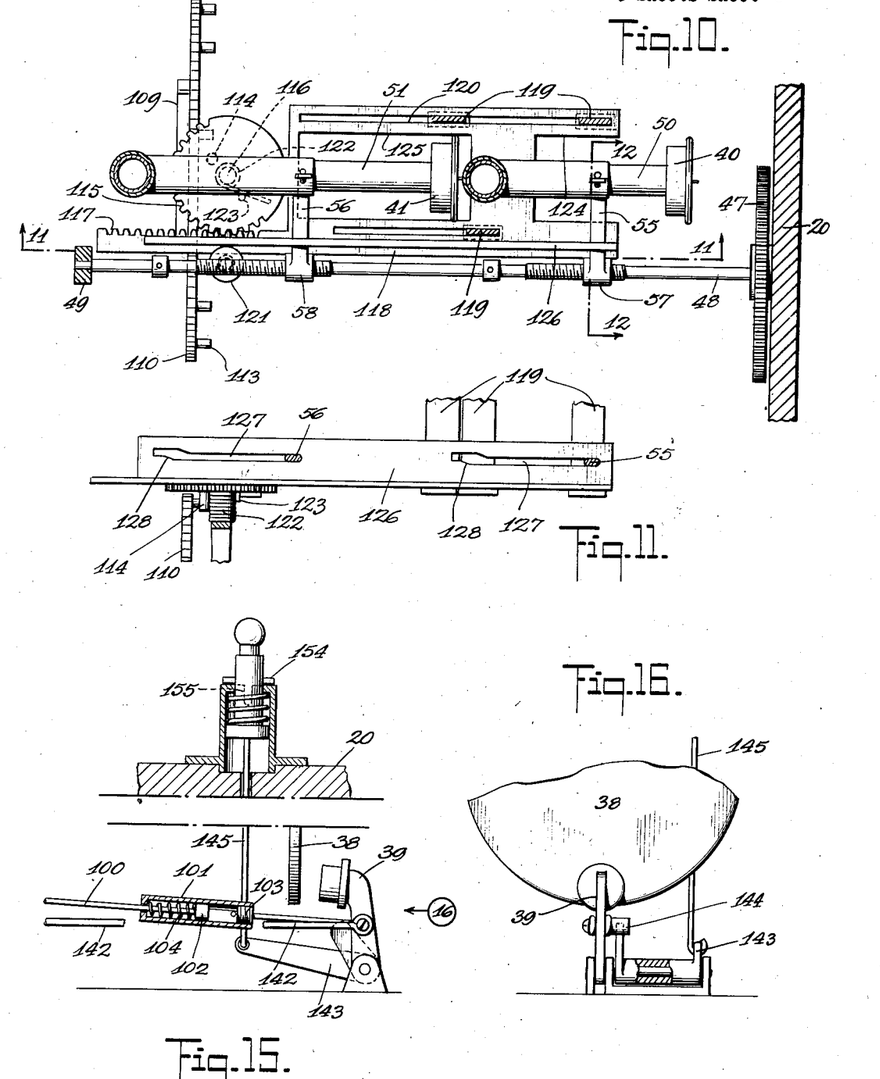
Fig. 10 is a horizontal section on the line 10—10 of Fig. 1.
Fig. 11 is a vertical section on the line 11—11 of Fig. 10.
Fig. 15 is an enlarged detail partly broken away of the manually operable means for releasing the brake of the main spring motor.
Fig. 16 is a view of the parts shown in Fig. 15 as seen from the direction of the arrow 16.
Figure 12:
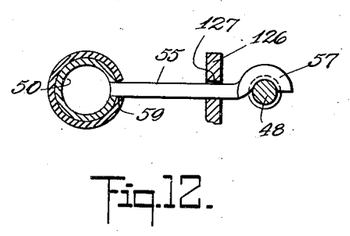
Figs. 12, 13 and 14 are sections on the lines 12—12 of Fig. 10 showing the parts in different operative positions.
Figure 13:
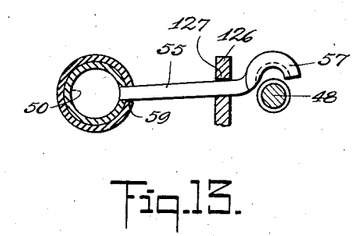

The spring motor 81 and gears 83, 84 are constructed and arranged to cause worm gear 84 to be rotated a complete revolution in a length of time approximately equal to the time required for the sound box 41 to be fed entirely across the record 26 by screw 48, but in order to obviate the necessity for timing the revolution of gear 84 with mathematical accuracy to the time required for the travel of the sound box 41 across the record the threaded portions of screw 48 are proportioned to the lengths of the records 26 and 42, as shown in Fig. 10, so that even if the spring motor 34 continues to rotate the record 26 and the screw 48 for a greater length of time than required, no further travel of either of the sound boxes beyond their respective records will occur. It therefore is desirable to time the spring motor and its connected parts so that the worm gear 84 will make a complete revolution in a slightly greater time than required for the travel of the sound box completely across a record 26.

Figure 8:
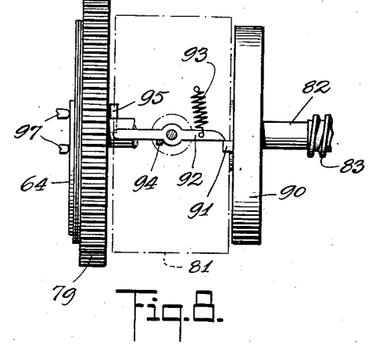
Figs. 8 and 9 are enlarged, horizontal, sectional details taken on the line 8—9 of Fig. 1.
Figure 9:
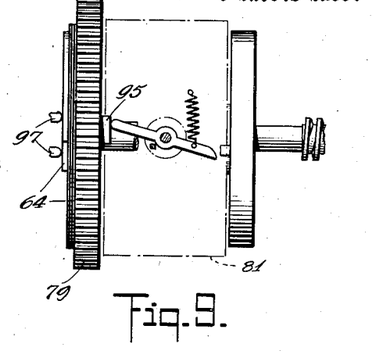

A disk 90 secured to shaft 82 has a pin 91 projecting therefrom which is adapted to engage a lever 92 pivotally mounted upon the lower face of spring motor 81 (see Figs. 1, 8 and 9). A spring 93 having its ends secured to lever 92 normally holds the lever against a stop 94 with the right hand end of the lever in the path of pin 91 so as to prevent rotation of disk 90 and shaft 82. When the alternating current motor 63 is rotated, to drive crank shaft 70 through the gearing 73, 74 and shafts 75, 76, a lug 95 projecting from gear 79 on crank shaft 70 will engage the left hand end of lever 92 just as the throw of counter-shaft 70 reaches the top of its travel, thus moving the lever 92 from the position shown in Fig. 8 to the position shown in Fig. 9, and releasing the right hand end of the lever from pin 91 and permitting shaft 82 to begin rotation, the spring of motor 81 yielding to allow a slight backward movement of the disk 90 to release the pin 91.

Figure 6:
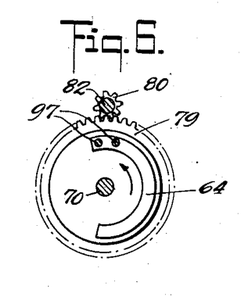
Figure 7:
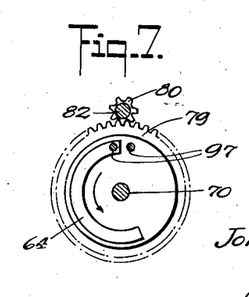
Fig. 7 is a view similar to Fig. 6 showing a different operative position of the parts.

An insulating block 96 secured to the left hand side of gear 79 has seated therein the contact plate 64 (see Figs. 1, 6, 7 and 23) of the timing switch which is adapted to bridge across the contacts 97 of circuit branch 62 during the time the throw of crank shaft 70 is travelling from its lowermost position shown in Fig. 6 to its uppermost position shown in Fig. 7 in which latter position the plate 64 has moved off one of the contacts 97 to break the circuit from the telephone line to the motor 63. A rod 98 has its upper end connected to the throw of crank shaft 70 and its lower end is connected to the longer arm of a bell crank 99 (see Fig. 1), the shorter arm of which is connected by a rod 100 having a lost motion connection 101 therein with the brake lever 39. The lost motion connection 101 (see Fig. 15) is so constructed that when rod 100 is pushed to the right by upward movement of rod 98 the enlarged head 102 will not engage the head 103 until the throw of counter-shaft 70 has reached its uppermost position. This lost motion movement and the provision of spring 104 in connection 101 also permits the brake lever 39 to be released by the manual actuation of means to be hereinafter described.

Means are provided for automatically rotating shaft 23 with disks 24, 25 to bring a fresh record 26 to operative position and said means comprises a rod 105 (Figs. 1 and 2) pivotally connected at its upper end to a pin 106 projecting from the face of ratchet wheel 89, the lower end of said rod being slidably received within a pivotally mounted tube 107. Intermediate its ends rod 105 is provided with a pin 108 which is adapted to engage, during a portion of its revolution about the dotted circle shown in Fig. 2, with one end of the ribs 109 which project laterally from one side of a disk 110, secured to shaft 23. The pin 108 and ribs 109 are so arranged as to cause the shaft 23 to be rotated one-sixth of a revolution to bring a fresh record to operative position as will be readily understood. The periphery of disk 110 is provided with ratchet teeth 111 with which a spring pressed pawl 112 engages to prevent backward movement of the shaft 23.

Means are provided for automatically returning the sound boxes 40 and 41 to their starting positions and said means comprise a plurality of pins 113 projecting laterally from the face of disk 110, opposite to the ribs 109. Each pin 113 as it approaches the top of its travel is adapted to engage a downwardly extending pin 114 (see Figs. 1 and 2) projecting from the face of a rack gear 115 rotatably mounted upon a stub shaft 116 (see Fig. 10) secured in the upper face of bracket 21. Engagement of a pin 113 with pin 114 occurs shortly after the shaft 70 23 has been rotated a sufficient distance to move the top record 26 out of contact with the needle of sound box 41. Rack gear 115 is in mesh with the rack teeth 117 provided upon an extension of a slide 118. The slide 75 118 is slidably supported upon a plurality of brackets 119 which pass through the elongated slots 120 provided in said slide and a grooved roller 121 is rotatably mounted upon a stud 122 secured in a lateral extension 21ª of bracket 21, said roller being in alignment with rack gear 115 to hold the rack teeth 117 in mesh with said gear. A torsion spring 122 is coiled about stub shaft 116 and has one end anchored in bracket 21 while its other end bears against a pin 123 fixed in the rack gear 115 to normally hold the gear and slide 118 in the position shown in Fig. 10. Slide 118 is provided with the cut out portions 124 and 125, the left hand edges of which are adapted to engage the sound boxes and push them towards the right when the slide 118 is pushed towards the right by pins 113, 114 and rack gear 115. A vertically extending portion 126 preferably integral with slide 118 is provided with the elongated slots 127 (see Fig. 11) through which arms 55 and 56 extend. The left hand end of said slots terminate in the raised cam portions 128 which are adapted to raise the arms 55 and 56 and thereby release the half nuts 57 and 58 from the threaded portions of screw 48 to permit the return of the sound boxes when the slide is pushed to the right.

A strong spring 129 (Figs. 1 and 5) has one end anchored to a suitable fixed point and its other end secured to pin 68 of gear wheel 69 to normally hold the throw of crank shaft 70 in its lower position and, as the signalling current of the telephone is intermittent, a pawl 89ª is provided to engage ratchet wheel 89 and prevent movement of the crank shaft in the direction opposite to the arrow A in Fig. 2.

Means are provided to turn the shaft 23 independently of the spring motor 34 and for this purpose the shaft 23 is extended through the wall of casing 20 and has secured thereto a knurled handle 130 (Fig. 1) having a pointer 131 projecting radially therefrom to rotate over a dial 132 (see Fig. 23) provided with suitably arranged indicia to indicate the various operative positions corresponding to each record 26. As an additional indicating and holding means for the shaft 23 a star wheel 133 (see Figs. 1 and 3) secured upon the shaft 23 inside and adjacent the side of casing 20, said star wheel having a plurality of recesses 134 one for each record 26. A lever 135 has a pin 136 projecting therefrom which pin is adapted to snap into the recesses 134 with a metallic click under the influence of spring 137 as the shaft 23 is rotated by the handle 130.

Means are provided to assist the brake lever 39 to check the rotation of shaft 23 and said means comprise the brake drum 138 (see Figs. 1 and 5) secured to shaft 23, and with which is adapted to engage the brake band 139 one end of which is suitably secured to the casing and the other end of which has secured thereto one end of an adjustable rod 140, the other end of which is secured to the longer arm of a bell crank lever 141. The shorter arm of said bell crank lever is connected by a rod 142 with the brake lever 39, the parts being so arranged that when brake lever 39 is actuated to engage the brake disk 38, rod 140 will pull downwardly upon the brake band 139 to cause it to engage the brake drum 138 and stop the rotation of shaft 23.

Means are provided to permit the spring motor 34 to be set in operat on independently of the automatic electrical control and these means comprise the small bell crank 143 (see Figs. 1 and 2) pivoted upon the same axis as the brake lever 39, the shorter arm of said bell crank being adapted to engage a pin 144 projecting from the side of brake lever 39 and the longer arm of the bell crank having secured thereto the lower end of a connecting rod 145, the upper end of which is connected to a finger grip 146 slidably mounted within a flanged ferrule 147 secured to the top of casing 20. Similar ferrules 148 and 149 are provided for the finger grips 150 and 151 which are connected by the rods 152 and 153 to the conduits 51 and 50, respectively, to permit the sound boxes 41 and 40 to be raised manually out of engagement with the records 26 and 42. Each of the finger grips 147, 148 and 149 is provided with a diametrically extending pin 154 the projecting ends of which are adapted to engage within slots 155 in the top edges of the ferrules when the corresponding parts are lowered and to engage with the top of the ferrules when the parts are raised.

The sounding horn 50ᵃ may be interchangeably fitted into either of the conduits 50 or 51 so as to permit the message which has been delivered to any record 26 to be conveniently listened to when desired. For checking up what messages may have been delivered in the absence of the subscriber, a memorandum indicator 156 (see Figs. 1 and 5) similar to the parts 130 to 132 is provided.

The operation of the device is as follows: Assuming the parts are in the position shown in Fig. 1 with the throw of counter- shaft 70 at its lowermost position, this being the normal initial starting position; the subscriber who is about to leave the telephone unattended will set the memorandum indicator 156 to agree with the indication of pointer 131 and dial 132, spring motor 34 will be wound by key 34ᵃ and the clamp 65 attached to the receiver hook 67 to hold the same in its lower position. The receiver 54 will then be placed within recess 53 thereby closing the circuit through wires 61. It will be understood the record 42 has been provided with a suitable message.

If the signalling current is now sent through the line, the alternating current motor 63 will be actuated intermittently, thus causing crank shaft 70 to be rotated by the connecting gearings 73, 74 and shafts 75, 76. As crank shaft 70 reaches the top of its travel, stop 88 on ratchet wheel 89 (Figs. 1 and 2) will engage lever 86, thus checking rotation of said crank shaft and preventing spring 129 from pulling the crank shaft downwardly in the direction of the arrow A in Fig. 2 and the engagement of pawl 89ᵃ preventing movement of the crank shaft in the opposite direction. When crank shaft 70 reaches the top of its travel pin 68 on gear 69 will have raised receiver hook 67 sufficiently to signal central that the line is closed. As the crank shaft 70 rotates in the direction of arrow A in Fig. 2, rod 98 is pulled upwardly to actuate bell crank 99, rod 100, thereby releasing brake lever 39 and applying brake band 139 just as stop 88 engages lever 86. The release of brake lever 39 permits the spring motor to rotate, thus driving the record 26 and screw 48 through the gearing provided for that purpose. The rotation of crank shaft 70 with ratchet gear 89 secured thereto, causes pin 108 to engage one of the ribs 109 to rotate shaft 23 and move the top record 26 out of position. Shortly after shaft 23 starts to rotate, a pin 113 engages pin 114, thus causing rack gear 115 to actuate slide 118 and return the sound boxes 40 and 41 to their initial starting positions. When crank shaft 70 reaches its top position the timer contact plate 64 will have moved to the position shown in Fig. 7 so that the current to the alternating current motor 63 will be shut off and as the stop 88 will be in engagement with lever 86 the parts will be held in operative position even if the signalling current continues to ring.

Just at the moment stop 88 engages lever 86, the lug 95 on gear 79 will engage the left hand end of lever 92 and move it to the position shown in Fig. 9 thus releasing spring motor 81, and actuating gear 84 in the direction of the arrow in Fig. 1. While gear 84 is rotating, screw 48 and records 26 and 42 will be rotated, record 42 delivering its message to the transmitter through sound box 40, conduit 50 and sounding horn 50ª, while record 26 will receive and record the message delivered by the receiver 54.

As heretofore pointed out spring motor 81 and the gears driven thereby are so timed that gear 84 will make a complete revolution in substantially the same time that is required for sound box 41 to travel across record 26 and as gear 84 completes its revolution pin 85 thereon will engage lever 86 and move it out of engagement with stop 88, thus permitting spring 129 to return the crank shaft 70 to its initial position. As crank shaft 70 is rotated by the alternating current motor 63, it will wind the spring motor 81 through gears 79 and 80 and as the crank shaft 70 is pulled downwardly by the spring 129 the one way clutch 78 will permit the rotation of the crank shaft without driving the gears 73, 74 and motor 63. When crank shaft 70 is pulled downwardy rod 98 will apply brake lever 39 and brake band 139, thus stopping the rotation of the records 26 and screw 48.

Figure 14:
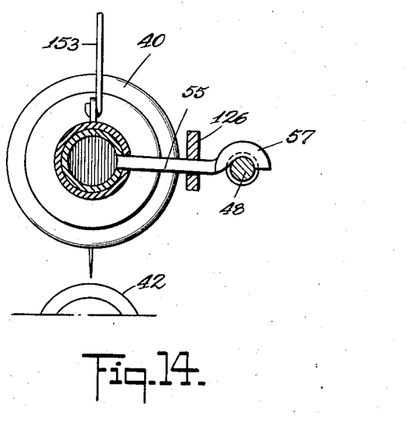

When the subscriber returns, the messages which have been received in his absence may be listened to by raising sound box 40 to the position shown in Fig. 14, turning shaft 23 to any desired record, and releasing brake lever 39 and brake band 139 by means of finger grip 146 to cause spring motor 34 to rotate the record.

Records 26 and 42 are preferably molded directly upon the mandrel to provide an unitary integral structure consisting of the record mandrel and shaft.

Various changes in the specific form shown and described may be made within the scope of the claims without departing from the spirit of my invention.

I claim:

1. In a telegraphone of the type adapted to be connected with a subscriber's telephone set and having means for recording an incoming message and reproducing an outgoing message, a rotatable record, means to rotate said record, controlling means, means actuated by the signalling current of the telephone circuit to actuate said controlling means, and connections between the receiver hook of the telephone set and said controlling means to cause said receiver hook to be raised by the actuation of said controlling means, said connections including a spring pressed clamp adapted to be detachably engaged with said receiver hook.

2. In a telegraphone of the type adapted to be connected with a subscriber's telephone set and having means for recording an incoming message and reproducing an outgoing message, a rotatable record, means to rotate said record, controlling means, means actuated by the signalling current of the telephone circuit to actuate said controlling means, and connections between the receiver hook of the telephone set and said controlling means to cause said receiver hook to be raised by the actuation of said controlling means, said connections including means to permit said connections to be adjusted to different telephone sets.

3. The combination with a subscriber's telephone set of means for reproducing an outgoing message and recording an incoming message, said means comprising a rotatable support, a plurality of records rotatably mounted upon said support, means to rotate one of said records when said support is in a predetermined position, a motor actuated by the signalling current of the telephone line, a controlling device actuated by said motor in an upward direction, means to normally hold said controlling device in a lower position, connections between the receiver hook of the telephone and said controlling device, means connected with said controlling device to automaticaly govern the actuation of said record rotating means, stop means to hold said controlling device at its uppermost position, and means operating in timed relationship with said record rotating means to release said stop means after a predetermined movement of said record rotating means.

4. The combination with a subscriber's telephone set of means for reproducing an outgoing message and recording an incoming message, said means comprising a rotatable support, a plurality of records rotatably mounted upon said support, means to rotate one of said records when said support is in a predetermined position, a controlling device, connections between said controlling device and the receiver hook of the telephone set to cause said receiver hook to be lifted when said controlling device is moved to a predetermined position, means actuated by said controlling device to automatically control the operation of the record rotating means, stop means to hold said controlling means in said predetermined position, and a spring motor operating in timed relationship with said record rotating means to release said stop means after a predetermined movement of said record rotating means.

5. The combination with a subscriber's telephone set of means for reproducing an outgoing message and recording an incoming message, said means comprising a rotatable support, a plurality of records rotatably mounted upon said support, means to rotate one of said records when said support is in a predetermined position, a controlling device, connections between said controlling device and the receiver hook of the telephone set to cause said receiver hook to be lifted when said controlling device is moved to a predetermined position, means actuated by said controlling device to automatically control the operation of the record rotating means, stop means to hold said controlling means in said predetermined position, and a spring motor operating in timed relationship with said record rotating means to release said stop means after a predetermined movement of said record rotating means, and gearing between said controlling device and spring motor to cause said motor to be wound by said controlling device simultaneously with the lifting of said receiver hook.

6. The combination with a subscriber's telephone set of means for reproducing an outgoing message and recording an incoming message, said means comprising a rotatable support, a plurality of records rotatably mounted upon said support, means to rotate one of said records when said support is in a predetermined position, a controlling device, connections between said controlling device and the receiver hook of the telephone set to cause said receiver hook to be lifted when said controlling device is moved to a predetermined position, means actuated by said controlling device to automatically control the operation of the record rotating means, stop means to hold said controlling means in said predetermined position, a spring motor operating in timed relationship with said record rotating means to release said stop means after a predetermined movement of said record rotating means, gearing between said controlling device and spring motor to cause said motor to be wound by said controlling device simultaneously with the lifting of said receiver hook, and a one way clutch interposed in said gearing.

7. The combination with a subscriber's telephone set of means for reproducing an outgoing message and recording an incoming message, said means comprising a rotatable support, a plurality of records rotatably mounted upon said support, means to rotate one of said records when said support is in a predetermined position, a controlling device, connections between said controlling device and the receiver hook of the telephone set to cause said receiver hook to be lifted when said controlling device is moved to a predetermined position, means actuated by said controlling device to automatically control the operation of the record rotating means, stop means to hold said controlling means in said predetermined position, a spring motor operating in timed relationship with said record rotating means to release said stop means after a predetermined movement of said record rotating means, gearing between said controlling device and spring motor to cause said motor to be wound by said controlling device simultaneously with the lifting of said receiver hook, and means actuated by said gearing to cause said spring motor to be released when said controlling device is moved to said predetermined position.

8. The combination with a subscriber's telephone set of means to reproduce an outgoing message and to record an incoming message, said means comprising a sending record and a receiving record, a sound box for each of said records, a conduit having one end thereof open, leading from each sound box and a sounding horn constructed and arranged to be interchangeably and detachably secured to the open end of either conduit.

9. The combination with a subscriber's telephone set of means for reproducing an outgoing message and recording an incoming message, said means comprising a rotatable support, a plurality of records rotatably mounted upon said support, means to rotate one of said records when said support is in a predetermined position, a controlling device, means actuated by said controlling device to automatically rotate said rotatable support, and means actuated by said controlling device when it reaches a predetermined position to check the rotation of said rotatable support.

10. The combination with a subscriber's telephone set of means for reproducing an outgoing message and recording an incoming message, said means comprising a rotatable support, a plurality of records rotatably mounted upon said support, means to rotate one of said records when said support is in a predetermined position, a controlling device, means actuated by said controlling device to automatically rotate said rotatable support, manually operable means to rotate said rotatable support and an audible signalling device to indicate the operative positions of said support.

11. The combination with a subscriber's telephone set of means for reproducing an outgoing message and recording an incoming message, said means comprising a rotatable support, a plurality of records rotatably mounted upon said support, means to rotate one of said records when said support is in a predetermined position, a controlling device, means actuated by said controlling device to automatically rotate said rotatable support, means actuated by said controlling device to check the rotation of said rotatable support and the record rotating means, and manually operable means to actuate said last named means independently of the operation of said controlling means.

In testimony whereof I affix my signature.

JOHN C. PAPADOPOULOS.